Fig. 1

INVENTORS
CLARENCE H. JORGENSEN
WILLARD T. NICKEL
HOWARD H. DIETRICH
DONALD P. WORDEN

THEIR ATTORNEYS

Aug. 11, 1953  C. H. JORGENSEN ET AL  2,648,194
JET ENGINE FUEL CONTROLLER
Filed Feb. 9, 1949  3 Sheets-Sheet 2

INVENTORS
CLARENCE H JORGENSEN
WILLARD T. NICKEL
HOWARD H. DIETRICH
DONALD P. WORDEN

BY *Spencer Hardman and Fehr*

THEIR ATTORNEYS

Aug. 11, 1953    C. H. JORGENSEN ET AL    2,648,194
JET ENGINE FUEL CONTROLLER

Filed Feb. 9, 1949    3 Sheets-Sheet 3

INVENTORS
CLARENCE H. JORGENSEN
WILLARD T. NICKEL
HOWARD H. DIETRICH
DONALD P. WORDEN

BY *Spencer Hardman and Fehr*

THEIR ATTORNEYS

Patented Aug. 11, 1953

2,648,194

UNITED STATES PATENT OFFICE 2,648,194

JET ENGINE FUEL CONTROLLER

Clarence H. Jorgensen, Willard T. Nickel, Howard H. Dietrich, and Donald P. Worden, Rochester, N. Y., assignors to General Motors Corporation, Detroit, Mich., a corporation of Delaware Application February 9, 1949, Serial No. 76,162

21 Claims. (Cl. 60—39.28)

The present invention relates to a control for jet engines.

Objects of the invention include control of the fuel valve in a manner such that acceleration can be effected at the maximum rate without danger of over-speed, excessive temperature, over-richness and over-leanness of the fuel mixture such as would cause the burners to go out. In the disclosed embodiment, these objects are accomplished by the use of a reversible electric motor which operates the fuel valve, manually controlled means which determines the direction of rotation of the motor for acceleration and deceleration and means under control by weight-air-flow and weight-fuel-flow for determining the rate of operation of the motor. The engine is under speed control during a portion of the movement of a throttle lever from idle position and is under temperature control during the movement of the lever which causes the engine power to reach the maximum. The control by the lever is limited by speed and temperature override devices which prevent excessive speed and temperature.

Further objects and advantages of the present invention will be apparent from the following description, reference being had to the accompanying drawings, wherein a preferred embodiment of the present invention is clearly shown.

The instrument 10 (Fig. 1) is a known form of temperature recording device having lever 11 which can be used to indicate temperature or to record it on a moving paper strip or dial. The position of the lever 11 is determined by the temperature to be measured. A temperature sensing element 12 which may be a thermocouple responsive to environment temperature or which may be a thermopile responsive to heat radiation is located in thermal relation to the turbine. The preferred thermocouple is a special type three-legged thermocouple which can be used in the circuit singly or in multiple units. This thermocouple was developed at the Bureau of Standards, Washington, D. C., and its principle is as follows. Referring to Fig. 3, A, B and C are thermocouple hot junctions exposed to the process variable to be measured. Assume a Chromel-Alumel couple is used. Junction A will produce an E. M. F., which we will represent by arrow "a." Junction B will produce an E. M. F. in the opposite direction since the relative connections of Chromel-Alumel are reversed in junction B. It will produce an E. M. F. as represented by arrow "b." Junction C will produce an E. M. F. represented by arrow "c." However, junction B is shielded to some partial extent as indicated at S, such that any change in the surrounding temperature will be recorded by junctions A and C initially to a greater extent than by junction B. Thus the voltage obtained from the thermocouple combination might be as represented by arrows "a'," "b'," and "c'." When the surrounding temperature settles out to a stable condition, the shielding of junction B is no longer effective and the resultant E. M. F. is simply the E. M. F. of one couple, since the other two couples will be equal in magnitude but opposite in effect, thereby cancelling themselves. The couple, as a whole, will measure a rate of change of surrounding temperature with respect to time, the value of which is dependent upon the amount of shielding of couple B. The positive terminal of element 12 is connected with the movable magnetizable contact 13 of a synchronous vibrator having a coil 14 connected with A. C. power input wires 15 and 16. Contact 13 vibrates between the poles of a permanent magnet 13m. Contact 13 makes one complete oscillation during each A. C. cycle to connect the positive terminal of element 12 alternately with transformer primary sections 17 and 18 connected with a movable wiper 19 which engages a resistance 20, one end of which is connected with the negative terminal of element 12 and the negative terminal of a battery 21 and the other end of which is connected with the positive terminal of battery 21. Assuming that an equilibrium condition exists, the wiper 19 has been located by means to be described so that no current flows through primaries 17, 18 when the vibrator 13 makes contact. If the element 12 senses a temperature change, then accompanying an oscillation of vibrator 13, there is set up in the primaries 17, 18 an A. C. wave having a relation to the A. C. wave of the power input which is in-phase or 180° out-of-phase depending on whether the temperature increases or decreases. The signal A. C. wave in the primaries 17, 18 is inductively transferred to the secondary winding 25 and is amplified by a voltage amplifier circuit which includes tubes 30 and 40 which have, respectively, plates 31 and 41, grids 32 and 42, cathodes 33 and 43, cathode heaters 34 and 44, cathode condensers 35 and 45, cathode resistors 36 and 46 which are grounded and plate resistors 37 and 47 which are connected to the plate supply at terminal 110 of a source to be described. Transformer secondary 25 is connected with grid 32. Condenser 38 connects plate 31 with grid 42 and condenser 48 connects plate 41 with grids 51 and 61 of tubes 50 and 60 respectively. The amplified signal is passed to the grids 51 and 61 of power amplifier tubes 50 and 60 whose plates 52 and 62 are connected respectively with the secondary winding sections 71a, 71b of a transformer 70 whose primary winding 72 is connected with the wires 15 and 16. The center tap of secondary 71 is connected with wire 73 and with a condenser 74 connected with a wire 75 which is grounded. Cathodes 53 and 63 are connected with resistance 64 connected with wire 75.

Figure 1:
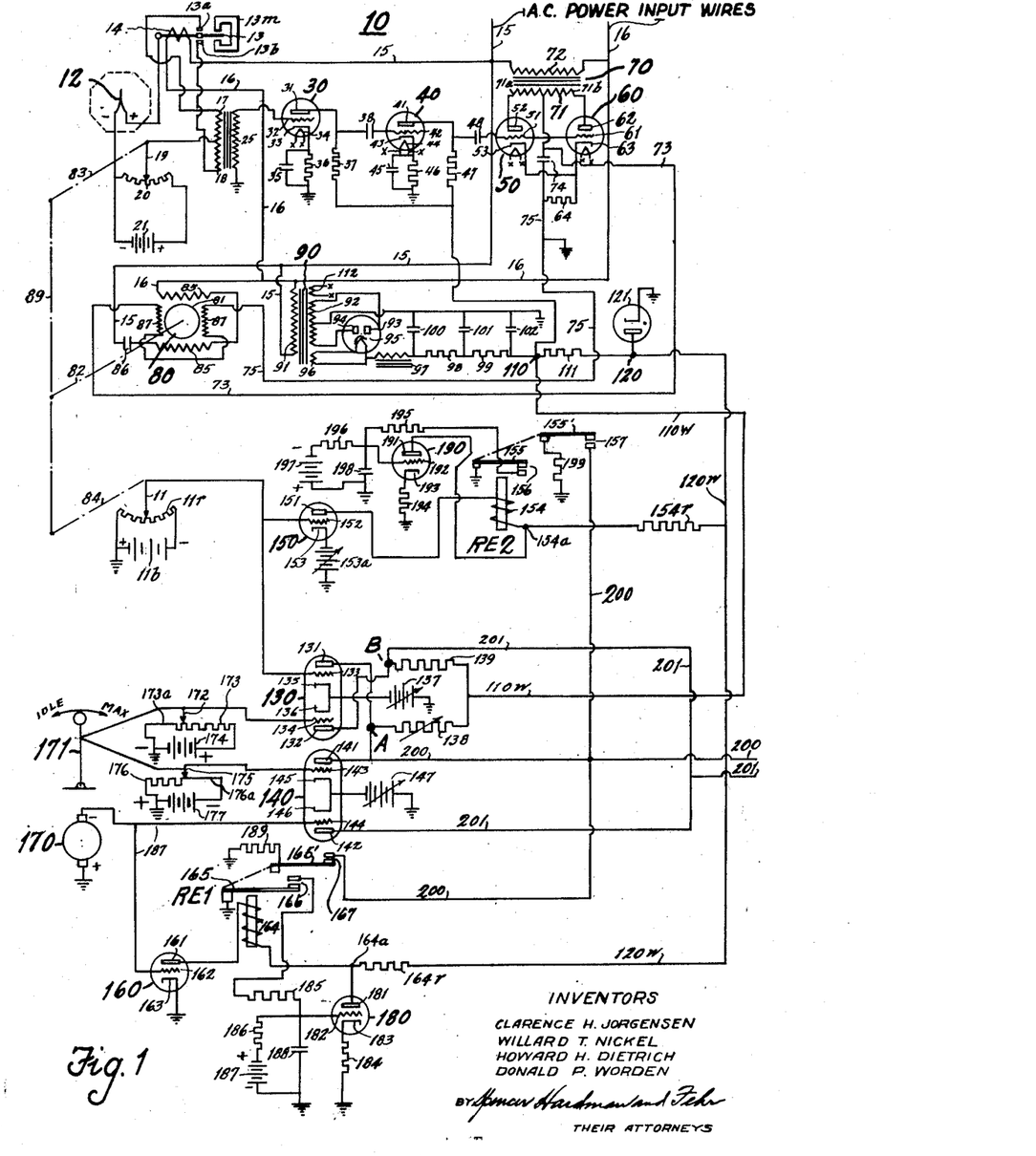
Figs. 1 and 2 together form a wiring diagram of the present control.
Figures 2, 3:
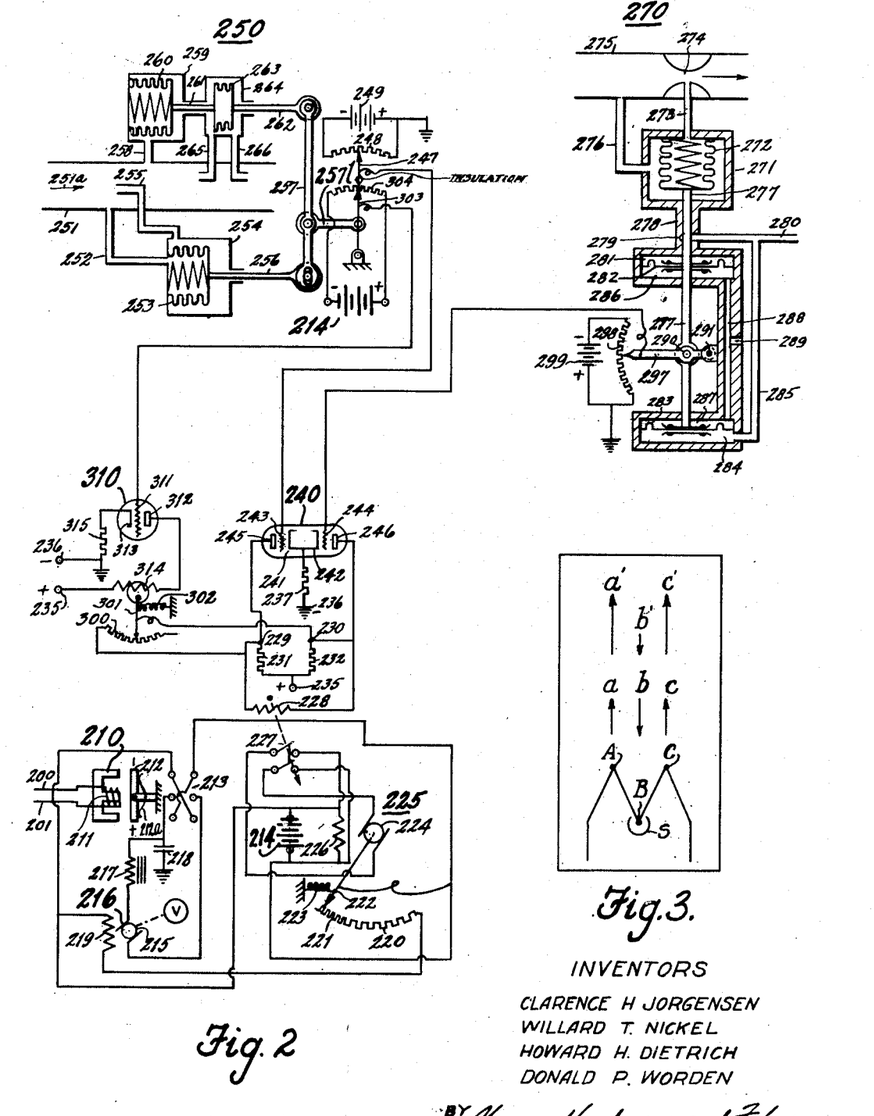
Fig. 3 is a diagram illustrating a thermocouple used with the control and its mode of operation.

A two-phase motor 80 has a squirrel cage rotor 81 mechanically connected through speed reducing gearing with indicator lever 11 and with wiper arm 19, this connection being represented in Fig. 1 by levers 82, 83, 84 and link 89. A strong field is provided by coils 85 permanently connected with wire 16 and through condenser 86 with wire 15 so that the current in these coils is in phase with the supply voltage across wires 15 and 16. Field coils 87 at 90 electrical degrees with coils 85 are connected with wires 73 and 75. The motor 80 will not operate if coils 87 are not energized; and, when coils 87 are energized, the direction of rotation of rotor 81 depends on the relation of the A. C. wave in coils 87 to the A. C. wave in coils 85. That relation is determined by temperature change increasingly or decreasingly. Whatever the temperature change may be, the rotor 81 rotates in a direction to move the lever 11 in the direction for proper temperature indication and the wiper 19 in the proper follow-up direction to a position of equilibrium such that current flow in primaries 17, 18 ceases when the lever 11 has moved into the position for properly indicating the temperature.

The operation of the unit 10 as described at pages 298–300 of Electronic Control Handbook by Batcher and Moulie, published by Caldwell-Clements, Inc. of New York City is as follows: The power amplifier that controls the direction of motor operation includes the two tubes 50, 60 connected as shown to operate as a parallel input, push-pull output stage. The potential at the plate of one tube is at any instant opposite in polarity to the potential at the plate of the other tube. Tubes 50 and 60 pass current only when the polarity of A. C. voltage from winding 71a or 71b is such that the respective plate 52 or 62 has a positive potential. Therefore, tube 50 can conduct only during the odd half-cycles of supply voltage and tube 60 can conduct only during the even half-cycles. Thus, a definite timing relationship exists between the power amplifier and the supply voltage.

The voltage applied to the grid 51 or to grid 61 determines the amount of plate current which will be conducted by the tubes. When a positive potential is applied to the grid of either tube during the half-cycle of its operation, the plate current approaches a maximum; and when a negative potential is applied, the plate current approaches a minimum. During the non-operating half-cycle of each tube, its plate current is zero regardless of grid voltage.

Half-wave pulses of current will pass through field windings 87 and condenser 74 during the odd half-cycles of supply voltage. During the even half-cycles, the tubes will pass no current, but condenser 74 will discharge into the windings 87. Thus, with an in-phase signal in the grids 51, 61, a sine-wave alternating voltage, in phase with the supply voltage, is developed across the windings 87 and the motor 80 operates in one direction. When the signal applied to grids 51, 61 is 180° out-of-phase with the supply voltage, tube 60 will conduct during the even half-cycles of supply voltage. A half-wave current impulse will then pass through field windings 87 and condenser 74. During the odd-half cycles of supply voltage, condenser 74 will discharge through windings 87. Thus, with a grid signal 180° out-of-phase with the supply voltage, a sine-wave voltage 180° out-of-phase with the supply voltage is developed across windings 87 and the motor 80 operates in the opposite direction.

During the period of zero grid signal, tubes 50, 60 conduct equal pulses of current on both negatives and positive half-cycles of supply voltage. The current flow in winding 87 is then pulsating direct current and the motor 80 does not start.

The synchronous switch or converter including vibratory contact 13 operates at power-line frequency and transfers any control potential that might exist to the primary windings 17, 18 of the signal input transformer. The coil 14 may be connected with the power line 15, 16 through a step-down transformer instead of directly as shown. During the odd half-cycles of supply voltage, contact 13a is engaged by contact 13 and, during the even half-cycles of supply voltage, contact 13b is engaged by contact 13. Each primary section 17, 18 functions alternately as an active primary.

Assume that wiper 19 is in equilibrium position. If there is a temperature increase, causing increase of voltage produced by element 12, the potential at the potentiometer wiper 19 will be less than the potential at the positive terminal of element 12. Current flow in primary sections 17, 18 is in a direction to effect an in-phase signal on grids 51, 61. The motor 80 will operate in the direction to move wiper 19 and indicator 11 counterclockwise. The motor 80 will stop when the potential at wiper 19 equals the potential at the positive terminal of element 12. When the temperature decreases, the potential at the positive terminal of element 12 is less than the potential at wiper 19, and grids 51, 61 receive a 180° out-of-phase signal and the motor 80 operates in the opposite direction to cause wiper 19 and indicator 11 to move clockwise. The motor 80 will stop when the potential at wiper 19 equals the potential at the positive terminal of element 12. Therefore, lever 11 stops at a position indicating the temperature.

The instrument 10 may be combined with a power supply unit. For this purpose wires 15 and 16 are connected to primary 91 of the transformer 90 having a secondary winding 92 connected with a rectifier tube 93 whose plates 94 are connected with the ends of the secondary 92 whose center tap is grounded. Tube cathode 95 whose heater is connected with secondary 96 is connected through a filter circuit (comprising choke 97 and resistances 98 and 99, and grounded condensers 100, 101, 102) with terminal 110 connected through resistance 111 with terminal 120 of a voltage regulator tube 121. The potential at terminal 119 may be, for example, +300 volts and the potential at tube terminal 120 may be +150 volts regulated voltage. Cathode heater terminals x, x are connected at x, x with secondary winding 112 of transformer 90.

In adapting the instrument 10 for use in a jet engine control system, the indicating lever 11 is used to control a grid bias by serving as a wiper engaging a resistance 11r connected across the terminals of a battery 11b. Wiper 11 is connected with grid 152 of tube 150 and grid 133 of tube 130 which is a twin-triode having plates 131 and 132, grids 133 and 134 and cathodes 135 and 136 connected with an adjustable potential 137. A second twin-triode 140 has plates 141 and 142, grids 143 and 144 and cathodes 145 and 146 connected with an adjustable potential 147.

Tube 130 has temperature selection elements-plate 132, grid 134 and cathode 136 and temperature balance elements-plate 131, grid 133 and cathode 135. Tube 140 has speed selection elements-plate 141, connected grid 143 and cathode 145, and speed balance elements-plate 142, connected grid 144 and cathode 146. Plates 131 and 141 are connected with a terminal A and plates 132 and 142 with a terminal B. The potentials of terminals A and B are controlled by tubes 130 and 140 in a manner to be described. Terminals A and B are connected by resistances 138 and 139 respectively with terminal 119 at +300 volts D. C. Resistance 138 is adjustable so that, initially, the potentials of A and B are equal. Tubes 130 and 140, which are of the same type, may be slightly unequal in characteristics. An initial adjustment of potentials 137 and 147 can be made to obtain equality.

Tube 150 is the temperature override control tube. It has a plate 151 connected with coil 154 of relay RE2, a grid 152 connected with grid 133 and a cathode 153 connected with adjustable potential source 153a. Relay RE2 controlled by tube 150 has armatures 155, 155' for closing normally open pairs of contacts 156 and 157 when coil 154 is sufficiently energized.

Tube 160 is the speed override control tube. It has a plate 161 connected with coil 164 of relay RE1, a grid 162 connected by wire 187 with grid 144. Relay RE1 controlled by tube 160 has armatures 165, 165' for opening normally closed pairs of contacts 166 and 167 when coil 164 is sufficiently energized.

The terminal 120 at +150 volts D. C. regulated potential is connected by wire 120w and resistance 154r with coil 154 of relay RE2, and by resistance 164r and with coil 164 of relay RE1. Coils 154 and 164 are normally deenergized and energized, respectively; and relays RE2 and RE1 hold their contacts 156, 157 and 166, 167, respectively, normally open.

Wire 200, connected with terminal A, and wire 201 connected with terminal B are connected with coil 211 of a relay 210 having a polarized armature 212 (Fig. 2) which controls in a manner to be described a fuel valve operating electric motor 216, the direction of rotation of which depending on which of the terminals A or B has the greater potential. A spring 212a holds armature 212 normally in neutral position for non-operation of motor 216.

The main control member is throttle lever 171 having a mechanical connection with a wiper 172 which is connected with grid 134 of tube 130 and which is slidable along a resistance 173 connected with a grid biasing battery 174. Lever 171 has a mechanical connection with a wiper 175 which is connected with the grid 143 of tube 140 and which is slidable along a resistance 176 connected with a grid biasing battery 177. During a portion of movement of wiper 172 by lever 171 from idle position, wiper 172 contacts a conductor 173a so that no change in the bias of grid 134 is made. Therefore, temperature control is not dominant during movement of the lever 171 in the lower power range. Since speed control only is to be dominant in the lower power range wiper 175 engages resistance 176 during movement of lever 171 in the lower power range. In the high power range position of lever 171, wiper 172 engages resistance 173 while wiper 175 engages a conductor 176a. By properly proportioning the lengths of the conductors 173a and 176a to the lengths of the resistances 173 and 176 respectively, the desired proportions of the ranges of dominant speed control and dominant temperature control can be effected. Obviously there can be positions of lever 171 in which these ranges of control overlap.

The speed indicating instrument is a tachometer generator 170 whose negative brush is connected with grids 144 and 162 and whose positive brush is grounded.

Initially, contactor 175 calls for a weak negative bias on grid 143, and generator 170 puts a weak negative bias on grid 144. Initially, contactor 172 calls for a strong negative bias on grid 134, and contactor 11 calls for a strong negative bias on grid 133. Tubes 130 and 140 initially do not cause any difference in potential between A and B. As lever 171 moves from idle toward the right, negative bias on grid 143 increases. Less current passes between plate 141 and cathode 145 and the IR drop through resistor 138 becomes less. Potential at A more nearly equals the supply potential (300 volts D. C.) and exceeds the potential at B, assuming the system had been in balance prior to the change of throttle position. Current flows from A through wire 200 to coil 211 and through wire 201 to B to cause the armature 212 (Fig. 2) to move in the direction to effect such conditioning of switch 213 that motor 216 opens the fuel valve. As speed increases, the negative bias on grid 144 increases and the potential at B is increased. When the potentials of A and B, as controlled by tube 140, becomes equal, opening of the fuel valve V, due to speed control, ceases. While the wiper 172 is engaging resistance 176, speed control is dominant.

While the wiper 175 engages conductor 176a and wiper 172 engages resistance 173, engine power is normally dominated by temperature control. As contactor 172 moves right, the negative bias on grid 134 decreases. Since grid 134 is now less negative, current flow will occur in resistor 139, causing increased IR drop and causing the potential at point B to decrease. Point A, therefore, is at higher potential relatively and current will flow from A to B through the coil 211 and the motor 216 will open the fuel valve V. As engine temperature increases, contactor 11 moves to reduce the negative bias of grid 133 and thus to reduce the potential at point A. The motor 216 will continue to operate until the temperature increases to a point where the potential at A is reduced to the potential of B. Then, as far as temperature control is concerned, the motor 216 stops opening valve V. When the speed tends to exceed the maximum safe limit, although the temperature limit has not been reached, the speed override control tube 160 becomes effective. This override control operates as follows: coincident with the reaching of maximum safe speed limit the tachometer voltage and grid 162 will reach some predetermined negative value at which point tube 160 will no longer conduct sufficient current to enable relay RE1 to hold its contacts 166, 167 open. Armature spring action will then close the relay contacts, in which case the condenser 188, resistance 185 (R. C.) circuit will discharge to ground through closed contacts 166. Prior to this action, the grid 182 of tube 180 had been held by battery 187 at approximately 4 volts positive; and under this condition, tube 180 had conducted sufficient current to cause a substantial voltage drop across resistor 164r thus lowering voltage at point 164a. However, when the grid of tube 180 swings to ground or zero reference voltage, tube 180 no longer conducts current and the voltage at point 164a rises. This increases the plate voltage to tube 160, causing sufficient increase in plate current of tube 160 to energize coil 164 to effect opening of the contacts of relay RE1. When this occurs, the potential of grid 182 rises to 4 volts positive which again lowers the potential of point 164a. This cycle is repeated so long as safe speed is exceeded. When relay RE1 allows its contacts 167 to close, line 200 is connected to ground through the resistor 189. The potential at A falls below potential at B and current flows through coil 211 of the polarized relay in such direction that motor 216 moves the fuel valve V toward closed position.

When safe temperature is exceeded, the grid 152 of tube 150 has positive bias such that tube 150 passes enough current through coil 154 of relay RE2 to cause it to close its contacts 156, 157. When contacts 156 close, condenser 198, which had been charged by battery 197, discharges; and the bias on grid 192 (which had been more negative than zero or ground) has zero bias and tube 190 conducts current sufficient to reduce the potential at 154a to a value such that coil 154 is not sufficiently energized to hold the relay contacts closed. When contacts 156 open, tube 190 becomes biased negatively and its conductivity is reduced and potential of 154a rises and relay RE2 closes its contacts again. This cycle is repeated so long as safe temperature is exceeded. Whenever contacts 157 close, the potential at A drops below the potential at B, and the fuel valve is moved toward closed position.

Figure 4:
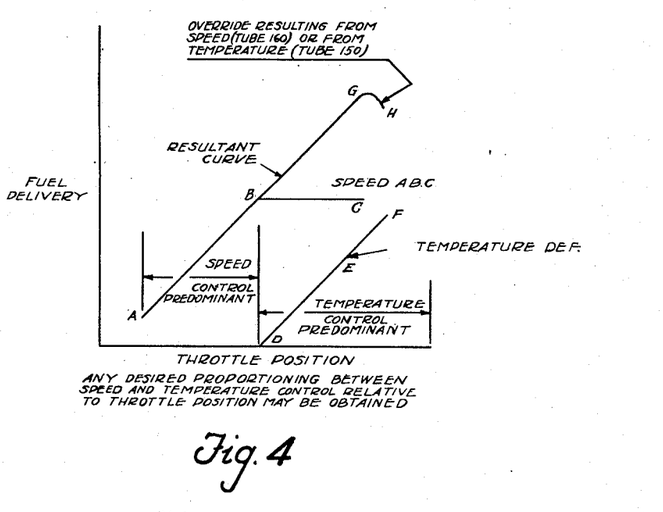
Fig. 4 is a chart illustrating control by speed and temperature.

Referring to Fig. 4, speed control and the temperature control of fuel delivery are in effect concurrently, as indicated by graphs ABC for speed control and DEF for temperature control and resultant graph ABC. Above a certain speed between idle and maximum, temperature control is predominant. The shapes, contours and proportioning of control effect are only relative and are illustrated only as an example. Below a certain throttle position, speed is the predominant control factor. The speed override control indicated at GH effected by the tube 160 and relay RE1 is effective to prevent over-speeding although maximum safe temperature has not been reached. Conversely, although maximum speed may not have been reached, maximum safe temperature will not be exceeded by virtue of the temperature override control provided by tube 150 and relay RE2, as indicated also by GH in Fig. 1.

Figure 5:
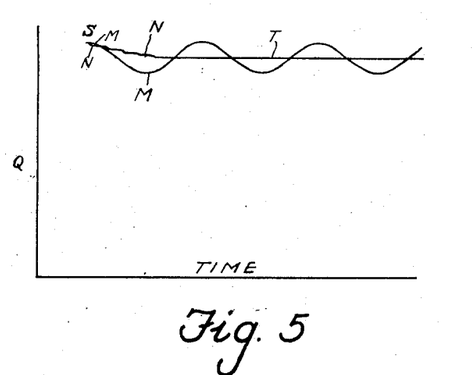
Fig. 5 is a diagram of the control effected by certain parts shown in Fig. 1.

Referring to Fig. 5, vertical distances Q represent quantity of fuel passing to the burners and horizontal distances represent time. S is a value of fuel delivery which is close to being unsafe. Line T represents a dependable safe value. If relays RE1 or RE2 acted without vibration to prevent unsafe operation, fuel value would fluctuate below and above value T as indicated by line M. By providing for vibration of these relays at a suitable frequency fuel value is reduced from S to T by a series of steps represented by line N. This frequency of vibration of relay RE1 is dependent on time of charging and discharging condenser 188 which time is proportional to the value of condenser 188 times the value of resistance 186 for condenser charging and is proportional to the value of condenser 188 times the value of resistance 185 for condenser discharging. The frequency of vibration of relay RE2 is likewise dependent on time of charging and discharging condenser 198 which time is likewise dependent on the RXC constants of the condenser circuits.

As stated heretofore, control of the engine fuel is effected in response to the differential of the potentials at A and B (Fig. 1). Terminals A and B are connected with coil 211 (Fig. 1) by wires 200 and 201 respectively of a polarized magnet 210 having an armature 212 (Fig. 2) which stands in a neutral position when the potentials at A and B are equal. If one of these potentials is greater than the other, the armature 212 moves from neutral position in the direction depending on which of the two potentials is greater. Armature 212 controls a reversing switch 213 in the circuit of a 24 volt D. C. source 214 and the armature 215 of a motor 216. This circuit includes a choke 217 and a condenser 218 connected therewith. Motor 216 controls the fuel valve V and therefore the rate of flow of the fuel to the burners of the jet engine. The function of the choke 217 and the condenser 218 is to act as a stabilizer. Condenser 218 opposes current surge thus preventing too rapid racing of the motor 216 at the start of its operation.

The field winding 219 of motor 216 is connected with the source 214 through a variable resistance comprising a main portion 220 and a vernier portion 221, both portions being engaged by a wiper 222 which a spring 223 tends to urge in a clockwise direction. The wiper 222 is operated by a motor 225 having a field winding 226 connected with the source 214. The armature 224 of motor 225 is connected with the source through a relay switch 227 which is normally open and is caused to be closed by the energization of a magnet coil 228. Motor 225 will operate so long as the switch 227 is closed. When the wiper 222 is in the position shown, all parts of the resistances 220 and 221 will be in the circuit of the field coil 219 of the motor 216 and the current in this coil will be relatively weak. Therefore, motor 216 will operate rapidly. As the wiper 222 moves to the right to the position shown, the resistance is reduced and the current flow in the field 219 increases. Therefore, the speed of the motor 216 is reduced.

As stated before, the relation of the potentials of terminals A and B determines whether or not the motor 216 will operate and the direction in which it will operate the fuel valve. When a predetermined amount of current flows through the coil 228, control is exercised over the rate of operation of the motor 216. Coil 228 is connected between terminals 229 and 230 in a bridge circuit which includes resistances 231 and 232 in two legs of the bridge and the plate 245 and cathode 241 of tube 240 in another leg of the bridge and the plate 246 and cathode 242 of tube 240 in the other leg of the bridge. A positive current source terminal 235 is connected with the resistances 231 and 232 and a negative or ground terminal 236 is connected through a resistance 237 with the cathodes 241 and 242. The grid 243 of the tube 240 is connected with the wiper 247 of a variable resistance 248 connected with a grid biasing source 249. The grid 244 of tube 240 is connected with the wiper 297 of a variable resistance 298 connected with a biasing source 299.

Wiper 247 is operated by a device 250 responsive to weight-air-flow. Device 250 has connections with the air duct 251 leading to the combustion chambers of the burner. Pipe 252 connects passage 251 with a bellows 253 in the housing 254 connected by a pipe 255 which faces into the air stream so that the rod 256 connected to the bellows takes a position in accordance with the velocity of air which moves in the direction of arrow 251a. A pipe 258 connects passage 251 with a housing 259 containing an aneroid 260. Therefore, the rod 261 connected with aneroid 260 takes a position in accordance with the density of air moving in the passage 251. The rod 261 is connected with a rod 262 through a bellows 263 containing a fluid which expands as the temperature of air moving in passage 251 increases, said bellows 263 being located in a housing 264 connected by pipes 265 and 266 with passage 251. It is therefore apparent that rod 262 takes a position in accordance with air density. Rods 256 and 262 are connected with a floating lever 257 which a link 257l connects with a wiper 247. Therefore, wiper 247 takes a position in accordance with air velocity and air density and the biasing of the grid 243 is correspondingly controlled.

The bias on grid 244 is controlled in accordance with weight-fuel-flow by device 270 which comprises a housing 271 containing a bellows 272 connected by a pipe 273 with a venturi 274 in the fuel pipe 275 which is connected by a pipe 276 with the housing 271. The rod 277 connected with the free end of the bellows 272 therefore takes the position in accordance with fuel flow rate. Rod 277 is connected at 290 with wiper 297 which is pivoted at 291. Any liquid fuel which leaks from the housing 271 through the rod guide 278 is received by an annular groove 279 and returns to the fuel tank through a pipe 280. Any further leakage is received in a chamber 281 on the upper side of a diaphragm 282 which is connected with the rod 277. Rod 277 is connected also with a diaphragm 283 located above a chamber 284 which a pipe 285 connects with the pipe 280. The chambers 286 and 287 located respectively below and above diaphragm 282 and 283 are vented by passages 288 and 289. It is, therefore, apparent that the pressure in the upper side of the diaphragm 282 is equal to the pressure on the lower side of the diaphragm 283 and the rod 277 is balanced with respect to the pressure of the fuel escaping from the housing 271.

Since grid 243 is biased in accordance with weight-air-flow and grid 244 is biased in accordance with weight-fuel-flow, the control of the current passing through the relay coil 228 will be in accordance with fuel-air ratio. If this fuel-air ratio were to remain constant no further control would be required.

The jet engine for which the system is adapted to be used may be one which will operate at low speed on a mixture which, for example, is three times as rich as would be possible for operation of the engine at high speed. In order to effect rapid acceleration of the engine from low to high speed advantage is taken of this characteristic. The engine is accelerated from low speed with a relatively rich mixture and the control provides for reduction of richness as the engine attains maximum speed. For this purpose a rheostat 300, having a wiper 301, is connected in parallel with the coil 228. A spring 302 normally urges the wiper 301 counterclockwise to obtain greatest resistance value of rheostat 300. The position of wiper 301 is controlled by dynamometer relay coil 314 connected with current source terminals 235 and 236 by a tube 310 having a plate 312 connected with coil 314, a cathode 313 connected with resistance 315 and having a grid 311 normally positively biased by a battery 214 connected with a bias adjusting rheostat 304 having a wiper 303 connected with grid 311. Wiper 303 is mechanically connected with wiper 247 but is electrically insulated therefrom. At idle speed, wiper 303 is located in contact with the right end of rheostat 304 so that the positive bias of grid 311 is maximum. Therefore sufficient current is passed by tube 310 to effect full energization of coil 314 so that it causes wiper 301 to contact the left end of rheostat 300. Therefore, at low speed, when the resistance value of rheostat 300 is small, a greater potential difference is required between terminals 229 and 230, in order to effect energization of the coil 228 and to close switch 227, because a low resistance will be in parallel with the coil 228. Therefore, at low speed, the fuel-air-ratio will be controlled within a wide band. As the engine speed increases the weight-air-flow increases. Therefore the wiper 303 is moved from right position toward left thereby increasing negatively the bias on grid 311 of tube 310. As the bias on grid 311 is negatively increased the current flow through coil 314 decreases, thereby causing wiper 301 to be moved counterclockwise by the spring 302 in order to increase the resistance value of rheostat 300. It is therefore apparent that when the resistance of rheostat 300 is relatively high the energization of coil 228 to close the relay switch 227 can be effected by relatively small potential difference between the terminals 229 and 230. Since this potential difference is controlled by the differential of voltage drop in the two halves of tube 240, the fuel-air ratio will be held within a relatively narrow range or band which is required for high speed operation.

Figure 6:
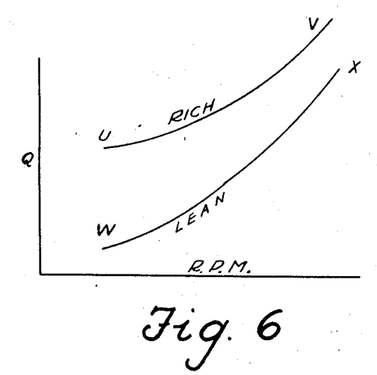
Fig. 6 is a chart showing relation of fuel quantity and engine speed under certain conditions.

In Fig. 6, vertical distances Q represent fuel quantity and horizontal distances represent engine speed. As lever 171 (Fig. 1) is moved clockwise to demand greater engine speed, fuel valve V is opened relatively rapidly by motor 216. Fuel increases more rapidly than engine speed increases, hence, the fuel mixture tends to become over-rich. Line U—V represents permissible richness and line W—X represents permissible leanness over the speed range. There can be a wide variation in fuel ratio at low speed but this variation or band must be restricted as engine speed increases. Therefore, since increase of engine speed is accompanied by increase in air flow to the engine, negative bias on grid 311 of tube 310 increases, the conductivity of tube 310 decreases, spring 302 moves wiper 301 counterclockwise to reduce current flow through rheostat 300, less current is by-passed from coil 228, coil 228 operates to close switch 227 whereupon motor 225 operates to move wiper 222 counterclockwise to cause motor 216 to run slower in fuel valve opening direction. Fuel flow rate increases at a decreasing rate. Therefore, richness of mixture is kept within the limit represented by line U—V. Too much derichment is avoided because, concurrently with decrease of the rate of fuel increase there is an increase of negative bias on grid 244 which keeps more in step with increase of negative bias on grid 243 with the result the potentials at 229 and 230 become more nearly equal and coil 228 is not sufficiently energized to keep switch 227 closed and it opens by spring action. Hence motor 225 stops moving wiper 222 counterclockwise and spring 221 moves it clockwise to increase the speed of opening of the valve V by motor 216.

As lever 171 (Fig. 1) is moved counterclockwise to demand less engine speed, motor 216 is caused to move the fuel valve V toward closed position. Fuel flow decreases more rapidly than engine speed and air flow. Therefore, the mixture tends to run to the lean limit represented by line W—X. Too much derichment is avoided in the following manner. Negative bias on grid 244 is decreasing faster than negative bias on grid 243 thereby causing such potential difference between points 229 and 230 that coil 228 is energized to close switch 227 so that motor 225 operates to retard operation of motor 216 in closing the fuel valve. Therefore, derichment does not take place so rapidly during deceleration that leanness falls below the line W—X. As speed decreases, air flow decreases and the positive bias on grid 311 of tube 310 increases. Coil 314 becomes more effective to move wiper 301 to the left to decrease resistance 300 so that more current is by-passed from coil 228; and a greater differential in the bias of grids 243 and 244 to cause a greater difference in the potential of points 229 and 230 is required to energize coil 228 sufficiently to effect closure of switch 227 to effect retard of fuel flow decrease. The required differential increases as speed decreases. Hence the range of fuel rate variation increases as speed decreases as indicated by the vertical distances between lines U—V and W—X.

In a jet engine having a combustion turbine driving a rotary blower, the tendency is toward overrichment during acceleration and toward over-derichment during deceleration. Therefore there is not likely to be overcorrection for richness during acceleration and overcorrection for leanness during deceleration except possibly in the high speed range when the permissible mixture range band is relatively narrow. It is conceivable that there might be over-leaning the mixture to counteract overrichment when accelerating from a high speed and there might be overriching the mixture to counteract over-leaning when decelerating from a high speed. In such case there would be an oscillatory movement of switch 227 accompanied by oscillatory movement of wiper 222 since a tendency toward overrichment results in closure of switch 227 and tendency toward over-leanment results in opening of switch 227.

The control of tube 310 could be effected by some means responsive directly to engine speed, but, if convenient, the weight-air-flow device 250 can be used for this purpose since device 250 is required in conjunction with device 270 to control fuel-air-ratio.

Electric motor 225 which turns the wiper 222 counterclockwise against the force applied by the spring 223 is a motor capable of operating as a stalled motor against spring force. When switch 227 opens the armature circuit of the motor, spring 223 returns the wiper to normal position at the left end of resistance 221.

The control of engine power by the control lever 171 and the speed and temperature sensing instruments are stable in operation. During movement of lever 171 from idle to medium power demand when speed control is predominant to control speed increase, engine speed is increasing at a rate less than the rate of increase of temperature. Therefore, while the "follow-up" effected by generator 170 to raise the potential of terminal B to the potential of terminal A, the potential of terminal A is being lowered appreciably due to movement of wiper 11 clockwise from right position to increase positive bias on grid 133. As wiper 172 is yet on conductor 173a there is no change of bias on grid 134 to balance the effect of temperature increase. Therefore a rising potential at terminal B meets a lowering potential at terminal A. This effect is conducive to stability of speed control.

During movement of lever 171 from medium power position to maximum power position, when temperature control is predominant, engine temperature is increasing at a rate faster than the rate of speed increase. Therefore, while the "follow-up" provided by the temperature sensing wiper 11 is operating to increase positive bias on grid 133 to lower the potential of terminal A to the potential of terminal B, the potential of terminal B is being raised appreciably due to operation as speed increases, of generator 170 to increase the negative bias on grid 144. As wiper 175 is yet on conductor 176a there is no change of bias of grid 143 to balance the effect of speed increase. Therefore a lowering potential at terminal A meets a rising potential at terminal B. This is conductive to stability of temperature control.

Obviously speed control and temperature would balance at values less than demanded by operation of the control lever 171. Therefore the grid biasing values determined by lever 171 are made such as to cause the system to set out for speeds or temperatures greater than those obtained when the system is in balance. This works to advantage because power increases initially more rapidly than otherwise and the rate of power increase is reduced as power increases to the value attained when the system is in balance. If, for example, the speed control, when predominant, is effective to control in the range of 4000–10,000 R. P. M., the system may be conditioned by lever 171 to demand 11,000 R. P. M. and would come to balance when the speed is 10,000 R. P. M. By setting out for more speed than obtained at balance, power increase is faster than otherwise. If, for example, the temperature control, when predominant, to control up to a maximum temperature of 1600° F., the system may be conditioned by lever 171 to demand 1700° F. and would come to balance at 1600° F. By setting out for higher temperature than obtained at balance, power increase is faster than otherwise.

Assuming the temperature control is predominant and that speed decrease kept pace with temperature decrease when lever 171 is moved left to decrease power, lever 171 increases potential at B to a value $x$ and balance would result when temperature reduction causes potential at A to rise to value $x$. Actually speed decreases at a rate slower than the rate of temperature decrease. Therefore any speed above the value normally corresponding to the demanded temperature causes the potential of B to be higher than $x$ and the duration of fuel-valve closing movement is greater than that required to obtain the temperature demanded so that there is a temporary balance when the temperature is reduced below the demanded value. For a brief interval there is an overreduction in temperature. But the system balances without disadvantageous delay at the demanded power setting because the excess of potential at B due to excess of speed is soon eliminated because over-reduction of fuel flow reduces speed more quickly than otherwise. The slight delay in effecting the final balance of the system is outweighed by the advantage of more rapid reduction in power when demanded.

If the lever 171 had been moved from the high power range into the low power range in which speed control is predominant, potential at A would be set by lever 171 at a value $y$ lower than potential at B to effect closing movement of the fuel valve. If temperature control were not present, balance would be established when speed falls in time to a value such that potential B is reduced to $y$. But because temperature falls more rapidly than speed, the temperature control causes potential at A to have a value $y+$ (higher than $y$). Therefore the duration of valve closing movement is less than time $t$ because the system will balance with less reduction of potential at B. There is temporary balance at some speed higher than demanded but this lasts only for a brief interval because temperature reduction has been retarded by arresting the closing movement of the fuel valve. By retarding temperature decrease, temperature and speed finally are brought into normal relation and the slower speed is established. The delay in establishing final balance is offset by the fact that over-leaning the mixture in the low speed range is avoided because the system operates to retard reduction of fuel-flow by virtue of the fact that temperature decreases faster than speed when the lever 171 is moved from high to low power position.

While the embodiment of the present invention as herein disclosed, constitutes a preferred form, it is to be understood that other forms might be adopted.

What is claimed is as follows:

1. Apparatus for controlling a jet engine having burners and comprising a valve controlling fuel flow to the burners, a reversible motor for operating the valve, a motor control device for controlling direction and extent of movement of the motor, said device including an element movable in one direction to cause the motor to open the valve and in the opposite direction to close the valve, a power controlling member, means responsive to movement of the control member from a set position to cause said element to cause operation of the motor to effect a change in engine operating condition, means sensitive to the engine operating condition, and means operated by the sensing means for causing cessation of motor operation when the change in engine operating condition determined by the control member has been effected.

2. Apparatus according to claim 1 further characterized by the provision of means sensing fuel mixture ratio, and speed controlling means for said reversible motor under control of said fuel mixture ratio sensing means for preventing operation of the motor fast enough to cause over-richness or overleanness of the fuel mixture.

3. Apparatus according to claim 1 further characterized by the provision of means operative when a predetermined condition of unsafe engine operation, produced by excess opening movement of the fuel valve is approached for effecting movement of the movable element of the motor control device in a direction to cause the motor to move the fuel valve toward closed position if said valve is opened sufficiently to cause unsafe operation.

4. Apparatus for controlling a jet engine having burners and comprising a valve controlling fuel flow to the burners, a reversible electric motor for opertaing the valve, a relay having a polarized armature, a spring holding the relay normally in neutral position and a coil for moving the armature in one of two directions depending on the direction of current flow in the coil, means under control by the armature for causing the motor to open or close the valve according to movement of the armature from neutral position, first and second terminals connected respectively with the ends of the relay coil, a current source for applying voltage to the terminals, a power controlling member, means responsive to movement of the control member from a set position to cause a potential differential in favor of one of the terminals whereby current flows in the relay coil to effect a change in fuel flow to cause the change in engine operating condition demanded by the control member, means sensitive to the engine operating condition and means operated by the sensing means for causing equalization of potential of the terminals when the change in engine operating condition determined by the control member has been effected.

5. Apparatus according to claim 4 further characterized by the provision of means sensitive to a predetermined condition of engine operation bordering on unsafety due to over-opening of fuel valve for effecting such differential of potential in favor of one of the terminals that current flows in the relay coil in the direction to cause the motor to move the fuel valve to closed position.

6. Apparatus for controlling a jet engine having burners and comprising a valve controlling fuel flow to the burners, a reversible electric motor for operating the valve, a relay having a polarized armature, a spring holding the relay normally in neutral position and a coil for moving the armature in one of two directions depending on the direction of current flow in the coil, means under control by the armature for causing the motor to open or close the valve according to movement of the armature from neutral position, first and second terminals connected respectively with the ends of the relay coil, a current source for applying voltage to the terminals, a control circuit having in parallel two resistances connected with one terminal of the current source and respectively with the coil terminals, and having in parallel conducting devices connected respectively with the coil terminals and with the other or ground terminal of the current source, a power controlling member, means responsive to movement of the member from a set position for changing the conductivity of one of the devices to obtain a potential difference between the coil terminals in order to cause the relay to operate to cause the motor to move the fuel valve in the direction required to satisfy the power demand made by the control member, means sensitive to a condition of engine operation and means operated thereby for changing the conductivity of the other device in order to equalize the potential of the coil terminals when the condition of engine operation satisfies the power demand.

7. Apparatus according to claim 6 further characterized by the provision of means sensitive to a predetermined condition of engine operation bordering on unsafety due to over-opening the fuel valve for introducing a circuit in parallel with one of the devices in order to effect such voltage differential between the coil terminals that the relay operates to cause the motor to move the fuel valve toward closed position.

8. Apparatus according to claim 6 further characterized by circuit for by-passing current around one of the conducting devices, said circuit including a resistance and normally open contacts, a relay for closing the contacts, means for causing the relay to close the contacts when there exists an engine operating condition bordering on unsafe operation due to over-opening the fuel valve, whereby such voltage differential between the terminals of the motor control relay coil is caused that the motor operates to move the fuel valve toward closed position, means responsive to said relay operation to cause such change of potential imposed upon the relay coil that the relay is caused to open the contacts and responsive to the contact opening operation of the relay for restoring the potential to normal whereby the by-passing relay periodically closes and opens said contacts.

9. Apparatus according to claim 6 further characterized by circuit for by-passing current around one of the conducting devices, said circuit including a resistance and normally open contacts, a relay for closing the contacts, said by-passing relay having a magnet coil, a current source, a resistance connected with a terminal of the current source and with one terminal of the by-passing relay coil, two circuits in parallel connecting the other terminal of the source with said coil terminal, one of the parallel circuits including the by-passing relay coil and a thermionic tube and the other parallel circuit including a thermionic tube, means responsive to a condition of engine operation bordering on unsafety due to over-opening the fuel valve for causing such change in bias in the tube first mentioned as to cause a change in energization of the by-passing relay coil that the relay is caused to close said contacts, means responsive to said relay operation for causing a change from normal in the bias of the second tube that, at said relay coil terminal, a change of potential is effected, such that the by-passing relay operates to open its contacts and means responsive to the contact opening operation of the relay to cause restoration to normal of the bias of the thermionic tube whereby the by-passing relay periodically closes and opens said contacts.

10. Apparatus according to claim 6 further characterized by circuit for by-passing current around one of the conducting devices, said circuit including a resistance and normally open contacts, a relay for closing the contacts, said by-passing relay having a magnet coil, a current source, a resistance connected with a terminal of the current source and with one terminal of the by-passing relay coil, two circuits in parallel connecting the other terminal of the source with said coil terminal, one of the parallel circuits including the by-passing relay coil and a thermionic tube and the other parallel circuit including a thermionic tube, means responsive to a condition of engine operation bordering on unsafety due to over-opening the fuel valve for causing such change in bias in the tube first mentioned as to cause a change in energization of the by-passing relay coil that the relay is caused to close said contacts, means responsive to said relay operation for causing a change from normal in the bias of the second tube that, at said relay coil terminal, a change of potential is effected, such that the by-passing relay operates to open its contacts, means responsive to the contact opening operation of the relay to cause restoration to normal of the bias of the thermionic tube whereby the by-passing relay periodically closes and opens said contacts and means for retarding the change of bias of the second tube from normal and back again and comprising a condenser connected with the grid of the second tube, a condenser charge circuit comprising a charging source, a resistance and the condenser and comprising a condenser discharge circuit including the condenser, a resistance and circuit controlling contacts closed by the by-passing relay when operating to close the by-pass contacts.

11. Apparatus for controlling a jet engine having burners and comprising a valve controlling fuel flow to the burners, a reversible electric motor for operating the valve, a relay having a polarized armature, a spring holding the relay normally in neutral position and a coil for moving the armature in one of two directions depending on the direction of current flow in the coil, means under control by the armature for causing the motor to open or close the valve according to movement of the armature from neutral position, first and second terminals connected respectively with the ends of the relay coil, a current source for applying voltage to the terminals, a control circuit having, in parallel, two resistances connected with one terminal of the current source and respectively with the coil terminals, and having in parallel thermionic conducting devices having plates connected respectively with the coil terminals, cathodes connected with the other or ground terminal of the current source and having grids, a power controlling member, grid biasing means under control by the control member for changing the bias of one of the grids in such direction that the potential differential in favor of one of the coil terminals is such as to effect fuel valve movement by the motor in the direction of satisfying the demand by the control member, and grid biasing means controlled by a condition of engine operation for so changing the bias of the other grid that equality of potential of the coil terminals is obtained when the power output of the engine equals that demanded by the control member.

12. Apparatus according to claim 11 further characterized by the provisions of means sensitive to a predetermined condition of engine operation bordering on unsafety due to over-opening the fuel valve for periodically introducing a resistance in parallel with one of the thermionic devices in order to obtain such potential differential between the coil terminals that the relay operates to cause the motor to move the fuel valve toward closed position.

13. Apparatus according to claim 11 in which the second mentioned grid biasing means is under control by an instrument which senses engine speed.

14. Apparatus according to claim 11 in which the second mentioned grid biasing means is under control by an instrument which senses engine temperature.

15. Apparatus for controlling a jet engine having burners and comprising a valve controlling fuel flow to the burners, a reversible electric motor for operating the valve, a relay having a polarized armature, a spring holding the relay normally in neutral position and a coil for moving the armature in one of two directions depending on the direction of current flow in the coil, means under control by the armature for causing the motor to open or close the valve according to movement of the armature from neutral position, first and second terminals connected respectively with the ends of the relay coil, a current source for applying voltage to the terminals, a control circuit having, in parallel, two resistances connected with one terminal of the current source and respectively with the coil terminals, and having in parallel, two sets of two thermionic conducting devices, each set having plates connected respectively with the coil terminals, cathodes connected with the other or ground terminal of the current source and having grids, one of the sets functioning for speed control and the other for temperature control, a power controlling member, two variable grid biasing means connected respectively with the grids of the speed control set, one grid biasing means being operated by movement of the control member from a set position demanding a speed change and the other in response to engine speed whereby movement of the control member to obtain a desired speed will effect such potential difference between the coil terminals that the motor operates the valve in the direction for effecting the speed change and the attainment of the engine speed demanded effects an equalization of potential and causes the motor to stop, other two variable grid biasing means connected respectively with the grids of the temperature control set, one of said biasing means of the temperature control set being operated by the control member from a set position demanding a temperature change and the other grid biasing means of the temperature set being responsive to engine temperature whereby movement of the control member to obtain a desired temperature will effect such potential difference between the coil terminals that the motor operates the valve in the direction for effecting the temperature change and the attainment of the engine temperature demanded effects an equalization of potential and causes the motor to stop.

16. Apparatus according to claim 15 in which the control member operated grid biasing means of the speed control set has provisions for limiting change of grid bias to movement of the control member in the range of low to medium power demand and in which the control member operated grid biasing means of the temperature control set has provisions for limiting change of grid bias to movement of the control member in the range of medium to maximum power demand.

17. Apparatus for controlling a jet engine having burners and comprising a valve controlling fuel flow to the burners, a reversible electric motor for operating the valve, a relay having a polarized armature, a spring holding the relay normally in neutral position and a coil for moving the armature in one of two directions depending on the direction of current flow in the coil, means under control by the armature for causing the motor to open or close the valve according to movement of the armature from neutral position, first and second terminals connected respectively with the ends of the relay coil, a current source for applying voltage to the terminals, a control circuit having, in parallel, two resistances connected with one terminal of the current source and respectively with the coil terminals, and having, in parallel, two sets of two thermionic tubes, each set having plates connected respectively with the coil terminals, cathodes connected with the other or ground terminal of the current source and having grids, one of the sets functioning for speed control and the other for temperature control, a power controlling member, means operated by the power control member during movement thereof from a low power position to a medium power position for increasing negatively the grid bias of that tube of the speed set connected with the first terminal of the relay coil whereby the potential of the first terminal exceeds that of the second terminal and the motor operates to open the fuel valve to cause engine speed to increase, means responsive to increase of engine speed for increasing negatively the bias of the other tube of the speed set whereby the potential of the second terminal is raised to the potential of the first terminal and the motor ceases operation when the speed demanded by the control member is satisfied, means operated by the power control member during movement thereof from a medium power position to a high power position for increasing positively the grid bias of that tube of the temperature set connected with the second terminal whereby the potential of the second terminal falls below that of the first terminal and the motor operates to open the fuel valve to cause engine temperature to increase, means responsive to increase of engine temperature to increasing positively the grid bias of the tube of the temperature set connected with the first terminal whereby the potential of the first terminal falls to that of the second terminal when the temperature demanded by the control member is satisfied, the means operated by the control member to control bias of a thermionic device of the speed set having provisions for change of bias only when the control member is moved in the range of low to medium power, the means operated by the control member to control the bias of a thermionic device of the temperature set having provisions for change of bias only when the control member is moved in the range of medium to maximum power.

18. Apparatus for controlling a jet engine having burners and comprising a valve for controlling the burners, a reversible motor for operating the valve, a power controlling member, means under joint control by the member and by engine speed and temperature for controlling the duration and direction of operation of the motor and electrical apparatus for controlling the speed of operation of the motor, said apparatus comprising a current source, an electromagnet coil having terminals, means under control by the coil when sufficiently energized for retarding the speed of the motor, a current source, a control comprising two fixed resistances connected to one terminal of the source and to the coil terminals, two devices of variable conductivity connected in parallel each to a coil terminal and both to the other source terminal, a variable resistance element connected across the coil terminals, means responsive to weight-air-flow for adjusting the conductivity of one of the devices, means responsive to weight-fuel-flow for adjusting the conductivity of the other of the devices, whereby a potential differential between the coil terminals becomes sufficient to cause the coil to effect retardation of motor speed when the fuel-air ratio tends to exceed predetermined limits of richness or leanness, and means for increasing the resistance of said resistance element as speed increases in order that effective energization of said coil will take place with less potential differential at said coil and resistance element terminals, thereby increasingly limiting the range of permissible fuel-air ratio as engine speed increases.

19. Apparatus according to claim 18 in which the devices of variable conductivity are thermionic tubes having plates connected to the coil terminals, cathodes connected to a current source terminal and grids, in which adjustable grid biasing means are connected with each grid and in which instruments respectively sensitive to weight-air-flow and to weight-fuel-flow control the grid biasing means.

20. Apparatus according to claim 18 in which the variable resistance element is a rheostat having a wiper arm urged by a spring toward high resistance position, in which a magnet coil moves the wiper toward lower resistance positions according to the extent of energization of the coil, a control circuit for the coil including a current source and a thermionic tube, and means for negatively increasing the grid bias of the tube as engine speed increases.

21. Apparatus according to claim 18 in which the valve operating motor has its field winding in series with a rheostat having a movable wiper arm urged by a spring to high resistance position and operated by an electric motor toward lower resistance positions depending on the duration of operation thereof and in which the speed control coil, when sufficienty energized, operates a switch which effects operation of said second electric motor.

CLARENCE H. JORGENSEN.
WILLARD T. NICKEL.
HOWARD H. DIETRICH.
DONALD P. WORDEN.

References Cited in the file of this patent

UNITED STATES PATENTS

| Number | Name | Date |
|---|---|---|
| 2,275,317 | Ryder | Mar. 3, 1942 |
| 2,316,240 | Harrison | Apr. 13, 1943 |
| 2,336,052 | Anderson | Dec. 7, 1943 |
| 2,457,595 | Orr | Dec. 28, 1948 |
| 2,482,254 | Fairchild | Sept. 20, 1949 |
| 2,485,431 | Chudyk | Oct. 18, 1949 |
| 2,492,472 | Fortescue | Dec. 27, 1949 |

FOREIGN PATENTS

| Number | Country | Date |
|---|---|---|
| 935,639 | France | Feb. 2, 1948 |
| 601,137 | Great Britain | Apr. 28, 1948 |
| 254,367 | Switzerland | Dec. 16, 1948 |